(12) United States Patent
Ishihara (10) Patent No.: US 10,933,679 B2
(45) Date of Patent: Mar. 2, 2021

(54) SCREEN PRINTING PLATE AND MANUFACTURING METHOD OF ELECTRONIC COMPONENT

(71) Applicant: TAIYO YUDEN CO., LTD., Tokyo (JP)

(72) Inventor: Shoji Ishihara, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 301 days.

(21) Appl. No.: 15/923,921

(22) Filed: Mar. 16, 2018

(65) Prior Publication Data

US 2018/0272783 A1     Sep. 27, 2018

(30) Foreign Application Priority Data

Mar. 27, 2017  (JP) .............................. JP2017-060466
Jan. 10, 2018  (JP) .............................. JP2018-001627

(51) Int. Cl.
| | | |
|---|---|---|
| *B41N 1/24* | (2006.01) | |
| *B41F 15/36* | (2006.01) | |
| *C04B 35/64* | (2006.01) | |
| *C04B 41/45* | (2006.01) | |
| *C04B 37/00* | (2006.01) | |
| *C04B 35/622* | (2006.01) | |
| *B32B 18/00* | (2006.01) | |

(Continued)

(52) U.S. Cl.
CPC .............. *B41N 1/247* (2013.01); *B32B 18/00* (2013.01); *B41F 15/36* (2013.01); *C04B 35/62218* (2013.01); *C04B 35/64* (2013.01); *C04B 37/003* (2013.01); *C04B 41/4578* (2013.01); *B41M 1/12* (2013.01); *B41P 2200/42* (2013.01); *C04B 2235/612* (2013.01); *C04B 2237/346* (2013.01); *H01G 4/0085* (2013.01); *H01G 4/012* (2013.01); *H01G 4/1227* (2013.01); *H01G 4/232* (2013.01); *H01G 4/248* (2013.01); *H01G 4/30* (2013.01)

(58) Field of Classification Search
CPC ........... B41F 15/36; B41N 1/24; B41N 1/247; B41N 1/248; B41P 2200/42
USPC .......................................................... 101/127
See application file for complete search history.

(56) References Cited

U.S. PATENT DOCUMENTS 3,772,160 A * 11/1973 Arndt ...................... B41C 1/142
205/75

FOREIGN PATENT DOCUMENTS

| JP | 2006335045 A | 12/2006 |
|---|---|---|
| JP | 2010042567 A | 2/2010 |

(Continued)

OTHER PUBLICATIONS

English language translation of WO 2012-115006 A1, publication date Aug. 30, 2012. (Year: 2012).*

*Primary Examiner* — Leslie J Evanisko
(74) *Attorney, Agent, or Firm* — Law Office of Katsuhiro Arai (57) ABSTRACT

In some embodiments, a screen printing plate 10 includes a metal mesh part 13 and a metal mask part 14 provided on one side of the metal mesh part 13 integrally with the metal mesh part 13. In addition, the metal mask part 14 has an opening part 14*a*, and when the dimension from the outer edge 14*a*2 of the opening part 14*a* to the metal mesh part 13 represents a fill depth, this fill depth is the largest in the part corresponding to the center area of the opening part 14*a*. The screen printing plate does not cause the actual printing thickness to vary easily, even when the target printing thickness is reduced.

15 Claims, 5 Drawing Sheets

(51) Int. Cl.
  *B41M 1/12* (2006.01)
  *H01G 4/30* (2006.01)
  *H01G 4/008* (2006.01)
  *H01G 4/232* (2006.01)
  *H01G 4/012* (2006.01)
  *H01G 4/248* (2006.01)
  *H01G 4/12* (2006.01)

(56) References Cited

FOREIGN PATENT DOCUMENTS

| JP | WO2014098118 A1 | 1/2017 | |
|----|----|----|----|
| WO | WO-2012115006 A1 * | 8/2012 | ............ B41F 15/36 |
| WO | 2014098118 A1 | 6/2014 | |

\* cited by examiner

SCREEN PRINTING PLATE AND MANUFACTURING METHOD OF ELECTRONIC COMPONENT

BACKGROUND

Field of the Invention

The present invention relates to a screen printing plate integrally comprising a metal mesh part and a metal mask part, as well as a manufacturing method of electronic component using such screen printing plate.

Description of the Related Art

Among the types of screen printing plates integrally comprising a metal mesh part and a metal mask part, one whose metal mask part is constituted by a metal plate (refer to Patent Literature 1 mentioned below), and another whose metal mask part is constituted by an electrodeposited metal (refer to patent Literature 2 mentioned below), are known. On both types, the paste filled in the opening part of the metal mask part is printed onto the printing target through the metal mesh part.

Incidentally, conductor-paste printing according to the screen printing method is widely used in the production of conductor layers in electronic components such as multilayer ceramic capacitors and multilayer ceramic inductors. However, electronic components are becoming increasingly smaller and thus requiring their conductor layers to be smaller in external shape and thickness, and meeting these requirements with traditional screen printing plates (screen printing plates whose opening part is formed in a mesh using an emulsion; refer to Patent Literature 3 mentioned below) is becoming difficult in terms of accuracy. Accordingly, the aforementioned screen printing plates (screen printing plates integrally comprising a metal mesh part and a metal mask part; refer to Patent Literatures 1 and 2 mentioned below) are used, instead of the traditional screen printing plates, in the production of conductor layers.

However, reducing the target printing thickness to meet the aforementioned requirements, especially reducing the target printing thickness to 1 μm or less, tends to cause the actual printing thickness of the conductor paste to vary, especially in a manner making the actual printing thickness of the printed paste smaller in the center part than in other parts, even when the aforementioned screen printing plates (screen printing plates integrally comprising a metal mesh part and a metal mask part; refer to Patent Literatures 1 and 2 mentioned below) are used. This gives rise to a concern that, if the actual printing thickness varies, this variation may remain in the produced conductor layers and cause the quality of the electronic component to drop.

BACKGROUND ART LITERATURES

[Patent Literature 1] International Patent Laid-open No. 2014/098118

[Patent Literature 2] Japanese Patent Laid-open No. 2010-042567

[Patent Literature 3] Japanese Patent Laid-open No. 2006-335045

SUMMARY

An object of the present invention is to provide a screen printing plate that does not cause the actual printing thickness to vary easily, even when the target printing thickness is reduced, as well as a manufacturing method of electronic component whereby conductor layers of reduced thickness can be produced without causing their thickness to vary, so that a high-quality electronic component can be manufactured.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the screen printing plate pertaining to the present invention is a screen printing plate comprising a metal mesh part and a metal mask part provided on one side of the metal mesh part integrally with the metal mesh part, wherein the metal mask part has an opening part, and when the dimension from the outer edge of the opening part to the metal mesh part represents a fill depth, this fill depth is the largest in the part corresponding to the center area of the opening part.

Also, the manufacturing method of electronic component pertaining to the present invention is a manufacturing method of electronic component using the aforementioned screen printing plate, comprising: a step to produce first ceramic green sheets; a step to produce second ceramic green sheets having unsintered conductor layers, by printing a conductor paste on the surfaces of the first ceramic green sheets; a step to produce an unsintered multilayer sheet by stacking the first ceramic green sheets and the second ceramic green sheets; a step to cut the unsintered multilayer sheet to produce unsintered component bodies; a step to produce component bodies with built-in conductor layers by sintering the unsintered component bodies; and a step to produce external electrodes connected to the conductor layers, on the surfaces of the component bodies.

According to the screen printing plate pertaining to the present invention, the accrual printing thickness does not vary easily, even when the target printing thickness is reduced. Also, according to the manufacturing method of electronic component pertaining to the present invention, conductor layers of reduced thickness can be produced without causing their thickness to vary, so that a high-quality electronic component can be manufactured.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 4A is an enlarged cross-sectional view of FIG. 3 along line L1-L1 pertaining to a type whose metal mask part is constituted by a metal plate, while

FIG. 5A is an enlarged cross-sectional view of FIG. 3 along line L2-L2 pertaining to a type whose metal mask part is constituted by a metal plate, while

FIG. 7A is an enlarged cross-sectional view of FIG. 3 along line L1-L1 pertaining to a type whose metal mask part is constituted by an electrodeposited metal, while

FIG. 8A is an enlarged cross-sectional view of FIG. 3 along line L2-L2 pertaining to a type whose metal mask part is constituted by an electrodeposited metal, while FIG. 8B is a drawing showing the fill depth corresponding to FIG. 8A.

DESCRIPTION OF THE SYMBOLS

10—Screen printing plate, 11—Plate frame part, 12—Auxiliary mesh part, 13—Metal mesh part, 13a—Metal mesh, 13b—Electrodeposited metal, 14, 14'—Metal mask part, 14a—Opening part, 14a1—Inner edge of opening part, 14a2—Outer edge of opening part, GS1—First green sheet, GS2—Second green sheet, UCL—Unsintered conductor layer, ULS—Unsintered multilayer sheet, UCB—Unsintered component body, CB—Component body, CL—Conductor layer, EE—External electrode.

DETAILED DESCRIPTION OF EMBODIMENTS

Figure 1:
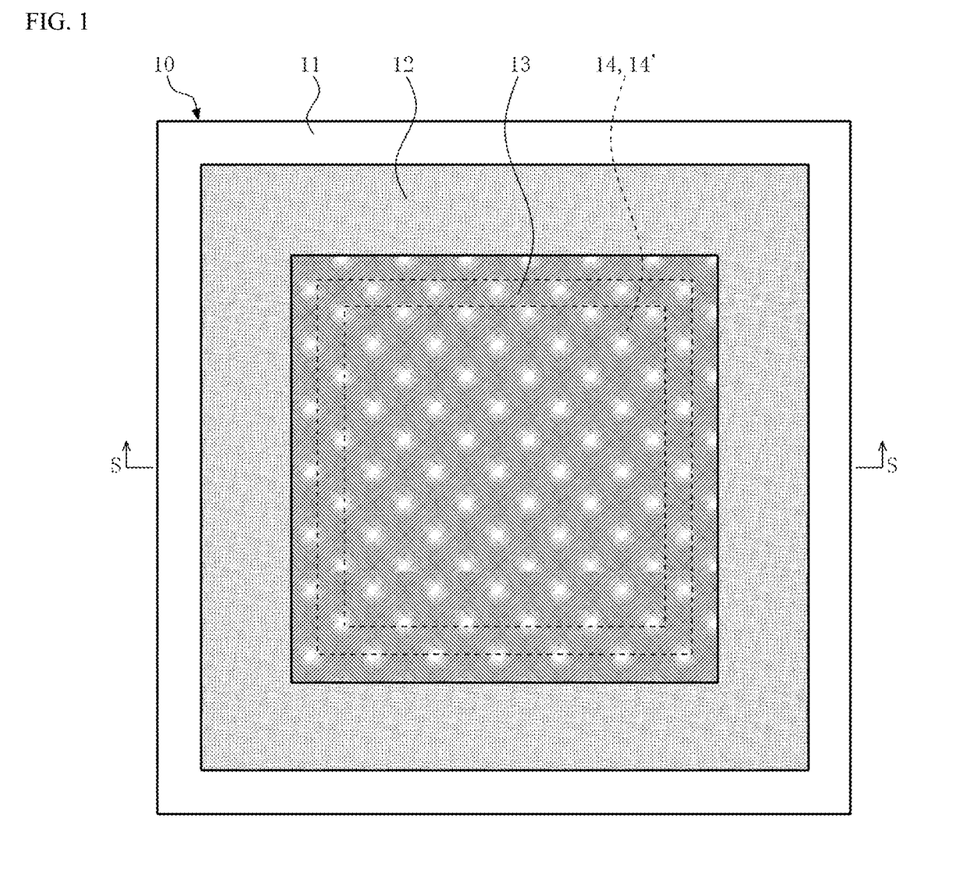
FIG. 1 is a plan view (top view) of a screen printing plate to which the present invention is applied.
Figure 2:
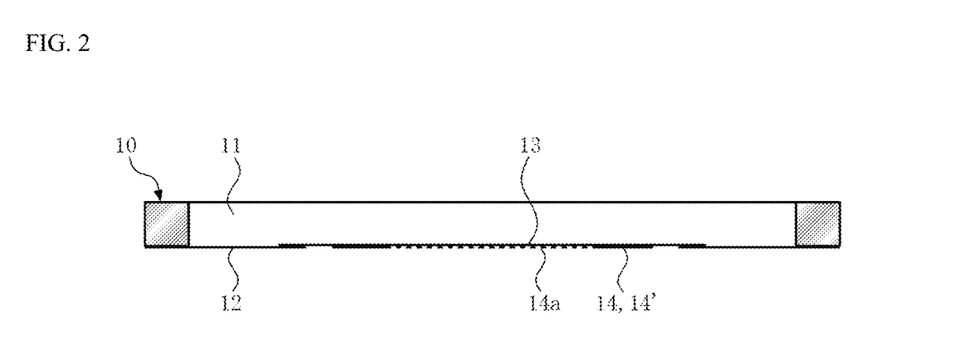
FIG. 2 is a cross-sectional view of FIG. 1, cut along line S-S.
Figure 3:
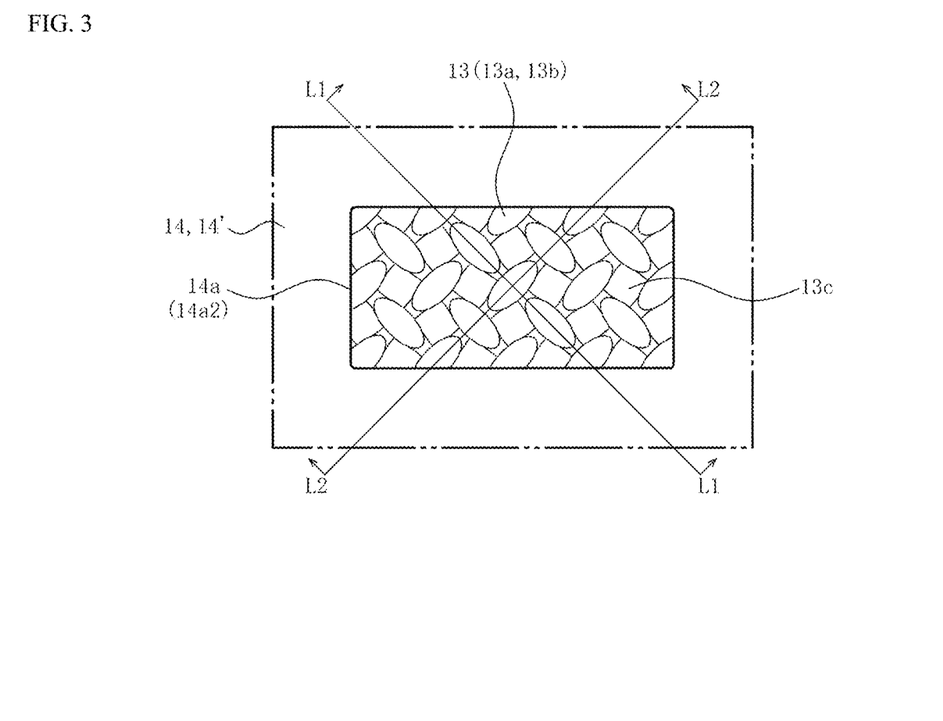
FIG. 3 is an enlarged bottom view of key parts of the screen printing plate shown in FIG. 1.
Figure 4A:
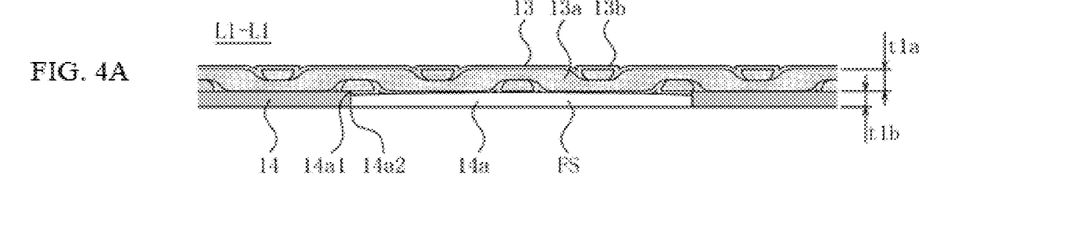
Figure 4B:
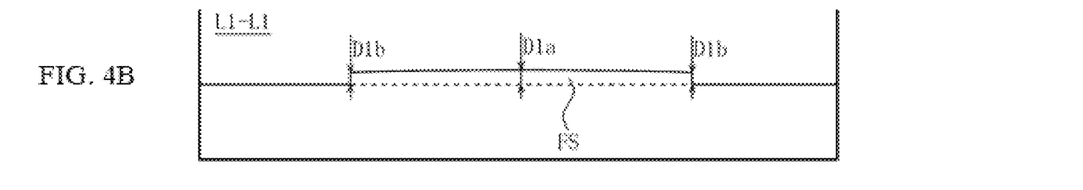
FIG. 4B is a drawing showing the fill depth corresponding to FIG. 4A.
Figure 5A:
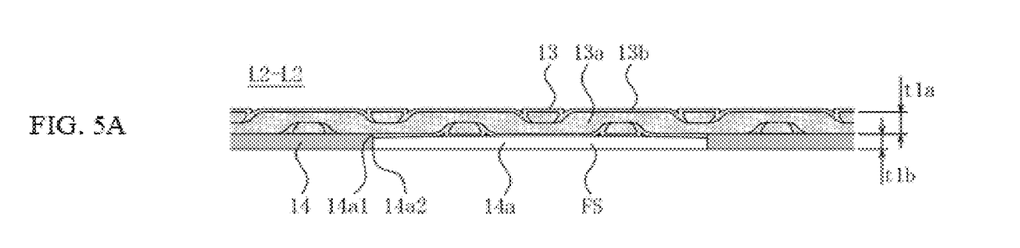
Figure 5B:
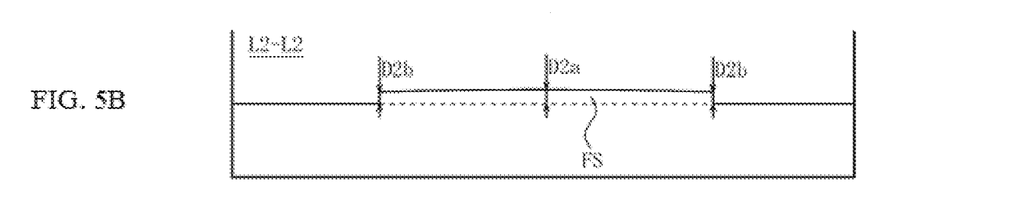
FIG. 5B is a drawing showing the fill depth corresponding to FIG. 5A.

First, the overall constitution of a screen printing plate 10 to which the present invention is applied is explained using FIGS. 1 to 3. It should be noted that FIGS. 1 to 3 are drawn to apply commonly to both type (1) whose metal mask part 14 is constituted by a metal plate, and type (2) whose metal mask part 14' is constituted by an electrodeposited metal.

This screen printing plate 10 comprises a rectangular plate frame part 11, an auxiliary mesh part 12 whose outer periphery is fixed to the plate frame part 11, a metal mesh part 13 whose outer periphery is fixed to the auxiliary mesh part 12, a metal mask part 14 or 14' provided on one side of the metal mesh part 13 integrally with the metal mesh part 13, and an emulsion part (not illustrated) provided in an unused part of metal mesh part 13. FIG. 1 is a top view showing two squares indicated by broken lines in the metal mesh part 13, wherein the outer square represents the periphery of the auxiliary mesh part 12 although the periphery is invisible in the top view, and the inner square represents the periphery of the metal mask part 14 or 14' although the periphery is invisible in the top view. Further, the metal mask part 14 or 14' has at least one opening part 14a (see FIG. 2) such as those indicated in FIG. 10B as UCL according to the printing pattern although the at least opening part is not shown in FIG. 1.

The plate frame part 11 is constituted by stainless steel, aluminum alloy, or other metal. The auxiliary mesh part 12 is constituted by wires of polyester, polyarylate, or other synthetic resin woven into a grid shape. The auxiliary mesh part 12 has a function to add tension to the metal mesh part 13, but it is not absolutely necessary. In other words, the auxiliary mesh part 12 may be eliminated and the outer periphery of a metal mesh part 13 of larger size may be directly fixed to the plate frame part 11. It should be noted that the constitution of the metal mesh part 13 and that of the metal mask parts 14, 14' are explained later.

Next, FIGS. 3 to 6C are used to explain the constitutions of the key parts of the type whose metal mask part 14 is constituted by a metal plate, an example of manufacturing method for this type, and effects, in this order.

The metal mesh part 13 is constituted by a metal mesh 13a and an electrodeposited metal 13b provided on the surface of the metal mesh 13a, and has many pores 13c. The metal mesh 13a is constituted by wires of stainless steel, tungsten or other metal woven into a grid shape. The metal mesh 13a shown in FIGS. 3 to 5B has been calendered, so flat parts (not accompanied by symbol) are formed on both sides of it in the thickness direction, at locations where the metal wires intersect. This calendering is a known method used primarily to reduce the thickness t1a of the metal mesh 13a, so it is not absolutely necessary if the metal wires constituting the metal mesh 13a have a small wire size and the thickness t1a of the metal mesh 13a itself is small.

Regardless of whether or not calendering is applied, the wire size of the metal wires constituting the metal mesh 13a is preferably in a range of 13 to 20 μm, the opening part is preferably in a range of 20 to 35 μm, and the thickness t1a of the metal mesh 13a is preferably in a range of 15 to 30 μm. Also, the electrodeposited metal 13b is constituted by nickel, nickel alloy, or other metal, and its thickness (not accompanied by symbol) is preferably in a range of 0.3 to 2 μm.

The metal mask part 14 is constituted by a metal plate, and has an opening part 14a corresponding to the printing pattern. The metal plate constituting this metal mask part 14 is joined to the metal mesh part 13 by the electrodeposited metal 13b provided on the surface of the metal mesh 13a. The metal plate constituting the metal mask part 14 is constituted by nickel, nickel alloy, etc. The thickness t1b (corresponding to the thickness of the metal mask plate 14) of this metal plate is preferably in a range of 0.3 to 4 μm. It should be noted that the thickness t1b of the metal mask part 14 may be specified not only in a range of 0.3 to 4 μm, but also in a range of 0.3 to 2.5 μm, or in a range of 0.3 to 1.5 μm. It should be noted that FIG. 3 depicts an opening part 14a whose outer shape is rectangular, for the sake of illustration, in the metal plate constituting the metal mask part 14; however, any of various shapes corresponding to the printing pattern can be adopted for the outer shape of the opening part 14a.

As is evident from FIGS. 4A to 5B, a fill space FS is formed by the inner face of the opening part 14a in the metal mask part 14 and by the part of the metal mesh part 13 on the inner edge 14a1 side of the opening part 14a (top edge side in FIGS. 4A to 5B). Also, when the distance from a plane defined by the outer edge 14a2 (bottom edge in FIGS. 4A to 5B) of the opening part 14a to the metal mesh part 13 represents a fill depth, this fill depth is the largest in the part corresponding to the center area of the opening part 14a (refer to fill depths D1a and D2a). The opening part 14 constitutes a recess formed by a sidewall defined between the inner edge 14a1 and the outer edge 14a2 and an exposed face of the mesh part 13 which constitutes a bottom of the recess (an upper face of the opening part in FIGS. 4A and 4B). The center area of the opening part 14a is an area in the exposed face of the mesh part 13 including a center of the exposed face and having substantially the largest fill depth (e.g., the center area is an area of the largest fill depth and may extend toward the periphery area such as to have an area of, for example, less than 50% of the exposed face). To elaborate on the above, the fill depth gradually increases from the part corresponding to the peripheral area of the opening part 14a (refer to fill depths D1b and D2b) toward the part corresponding to the center area of the opening part 14a (refer to fill depths D1a and D2a). The term "gradually" refers to a change in the distance between an approximate line drawn from any D1b to D1a and a plane defined by the outer edge 14a2, which change increases substantially continuously from the periphery area toward the center area of the opening part 14a in some embodiments. It should be noted that the ratio of the maximum value (refer to fill depths D1a and D2a) and the minimum value (refer to fill depths D1b and D2b), of fill depth, is preferably in a range of "1.2≤Maximum value/Minimum value≤2.0." In some embodiments, the size of the opening part is about 0.1 mm×about 0.2 mm to about 1.5 mm×about 3.5 mm (short side×long side), e.g., about 0.3 mm×about 0.6 mm.

Also, as is evident from FIGS. 4A to 5B, the aforementioned change in the fill depth is achieved by making the thickness (not accompanied by symbol) of the part of the metal mesh part 13 on the inner edge 14a1 side of the opening part 14a the smallest in the part corresponding to the center area of the opening part 14a (refer to fill depths D1a and D2a). To be specific, this is achieved by gradually decreasing the thickness (not accompanied by symbol) of the part of the metal mesh part 13 on the inner edge 14a1 side of the opening part 14a from the part corresponding to the peripheral area of the opening part 14a (refer to fill depths D1b and D2b) toward the part corresponding to the center area of the opening part 14a (refer to fill depths D1a and D2a). To be more specific, this is achieved by gradually decreasing the thickness (not accompanied by symbol) of the electrodeposited metal 13b in the part of the metal mesh part 13 on the inner edge 14a1 side of the opening part 14a from the part corresponding to the peripheral area of the opening part 14a (refer to fill depths D1b and D2b) toward the part corresponding to the center area of the opening part 14a (refer to fill depths D1a and D2a).

Figure 6A:
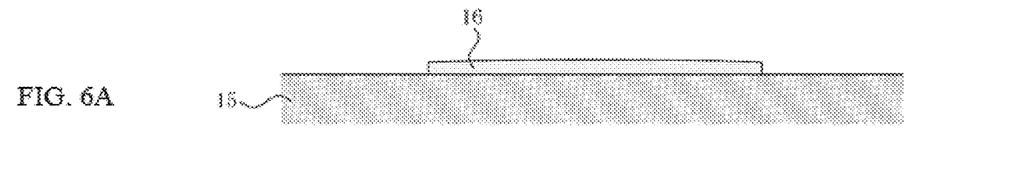
FIGS. 6A to 6C are drawings explaining an example of manufacturing method for a type whose metal mask part is constituted by a metal plate.
Figure 6B:
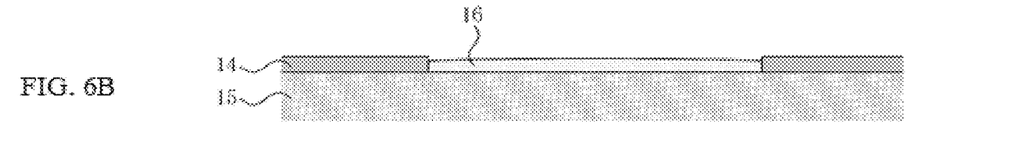
Figure 6C:
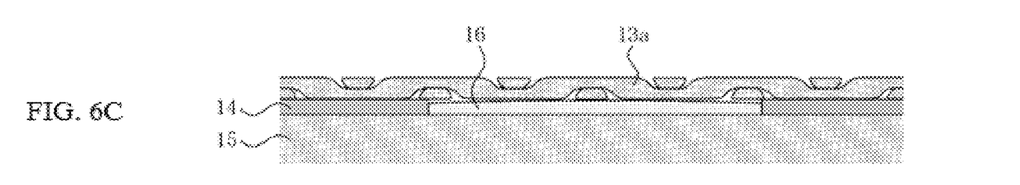
Figure 7A:
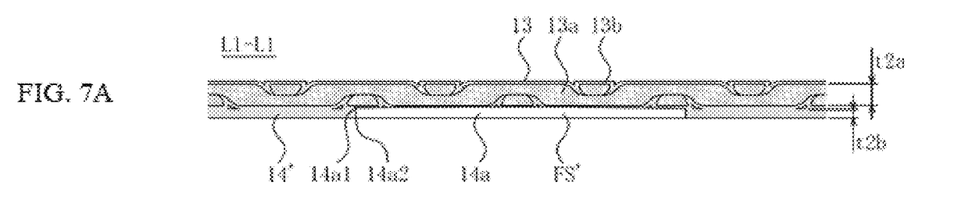
Figure 7B:
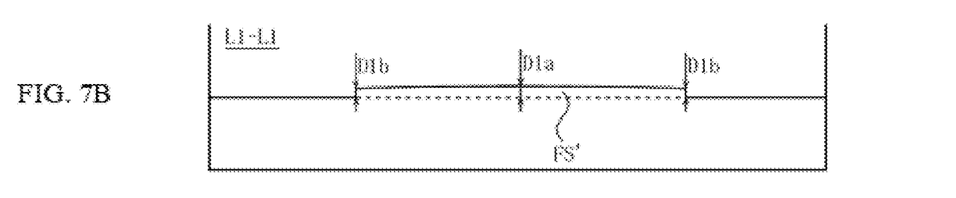
FIG. 7B is a drawing showing the fill depth corresponding to FIG. 7A.
Figures 8A, 8B:
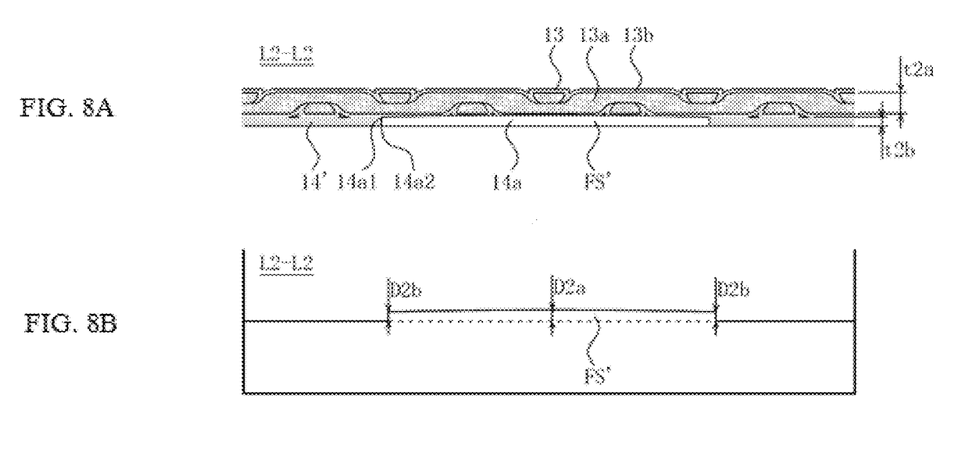

Here, FIGS. 6A to 6C are used to explain an example of a manufacturing method to obtain the mode shown in FIGS. 4A to 5B. It should be noted that the manufacturing method explained here is only an example and does not limit in any way the manufacturing method to obtain the mode shown in FIGS. 4A to 5B.

A substrate 15 formed by stainless steel or other metal is prepared, and a resist pattern 16 is formed on one side of the substrate 15 in a manner reversing the pattern of the opening part 14a in the metal mask part 14 (refer to FIG. 6A). This resist pattern 16 is formed by attaching a negative photoresist sheet to one side of the substrate 15, or by coating a positive or negative photoresist agent on one side of the substrate 15 and then eliminating the unnecessary parts using the photolithography method.

Then, the surface of the resist pattern 16 is processed into a curved convex shape (refer to FIG. 6A). For this processing, brushing, blasting, or other polishing method, or when a negative photoresist sheet or photoresist agent is used as part of the aforementioned photolithography method, a method of finishing the surface into a curved convex shape by utilizing the change in the swollen state of the resist pattern 16 due to development, may be adopted, among others.

Then, the electrocasting method is used to form a metal plate that will constitute the metal mask part 14, in parts where the resist pattern 16 does not exist on one side of the substrate 15 (refer to FIG. 6B). It should be noted that, while the thickness of the metal plate constituting the metal mask part 14 depicted in FIG. 6B is greater than the thickness of the peripheral part of the resist pattern 16, the thickness of the metal plate may be the same as the thickness of the peripheral part of the resist pattern 16.

Then, a metal mesh 13a is placed on top of the resist pattern 16 and the metal plate constituting the metal mask part 14 (refer to FIG. 6C), after which the electrocasting method is used to form an electrodeposited metal 13b on the surface of the metal mesh 13a. Because of this electrocasting, an electrodeposited metal 13b is formed on the surface of the metal mesh 13a, and at the same time the metal plate constituting the metal mask part 14 is joined to the metal mesh part 13 by the electrodeposited metal 13b (refer to FIGS. 4A to 5B).

Then, the metal mesh part 13 to which the metal plate constituting the metal mask part 14 has been joined, is detached from the substrate 15. If the resist pattern 16 has been detached together, the resist pattern 16 is removed after the detachment. The mode shown in FIGS. 4A to 5B is thus obtained.

According to the screen printing plate 10 of the type whose metal mask part 14 is constituted by a metal plate, the following effects can be achieved.

(E1) When the dimension from the outer edge 14a2 of the opening part 14a in the metal mask part 14 to the metal mesh part 13 represents a fill depth, this fill depth is the largest in the part corresponding to the center area of the opening part 14a. This suppresses any variation that would make the actual printing thickness of the printed paste smaller in its central part than in other parts, even when the target printing thickness is reduced at the time of printing the conductor paste, and therefore the paste can be printed in a manner keeping the actual printing thickness as uniform as possible.

(E2) The aforementioned fill depth gradually increases from the part corresponding to the peripheral area of the opening part 14a in the metal mask part 14, toward the part corresponding to the center area of the opening part 14a. This means that, even in situations where the actual printing thickness of the printed paste would vary in a manner gradually increasing from the central part toward the peripheral part, such variation can be suppressed and the paste can be printed in a manner keeping the actual printing thickness as uniform as possible. The "central part" of the printed paste corresponds to the "center area" of the opening part.

(E3) The aforementioned change in the fill depth is achieved by making the thickness of the part of the metal mesh part 13 on the inner edge 14a1 side of the opening part 14a the smallest in the part corresponding to the center area of the opening part 14a, or specifically by decreasing the thickness of the part of the metal mesh part 13 on the inner edge 14a1 side of the opening part 14a from the part corresponding to the peripheral area of the opening part 14a toward the part corresponding to the center area of the opening part 14a. In other words, nothing is done to the opening part 14a in the metal mask part 14 itself, and this eliminates any concern that the outer shape of the printed paste may vary. In particular, when the aforementioned change in the fill depth is achieved by gradually decreasing the thickness of the electrodeposited metal 13b in the part of the metal mesh part 13 on the inner edge 14a1 side of the opening part 14a from the part corresponding to the peripheral area of the opening part 14a toward the part corresponding to the center area of the opening part 14a, the problems that would otherwise result from the thickness of the metal mesh 13a decreasing partially, such as drop in strength or drop in durability, will no longer occur.

Next, FIGS. 3 and 7A to 9B are used to explain the constitutions of the key parts of the type whose metal mask part 14' is constituted by an electrodeposited metal, an example of manufacturing method for this type, and effects, in this order.

The metal mesh part 13 is constituted by a metal mesh 13a and an electrodeposited metal 13b provided on the surface of the metal mesh 13a, and has many pores 13c. The metal mesh 13a is constituted by wires of stainless steel, tungsten or other metal woven into a grid shape. The metal mesh 13a shown in FIGS. 3, 7A to 8B has been calendered, so flat parts (not accompanied by symbol) are formed on both sides of it in the thickness direction, at locations where the metal wires intersect. This calendering is a known method used primarily to reduce the thickness t2a of the metal mesh 13a, so it is not absolutely necessary if the metal wires constituting the metal mesh 13a have a small wire size and the thickness t2a of the metal mesh 13a itself is small.

Regardless of whether or not calendering is applied, the wire size of the metal wires constituting the metal mesh 13a is preferably in a range of 13 to 20 µm, the opening part is preferably in a range of 20 to 35 µm, and the thickness t2a of the metal mesh 13a is preferably in a range of 15 to 30 µm. Also, the electrodeposited metal 13b is constituted by nickel, nickel alloy, or other metal, and its thickness (not accompanied by symbol) is preferably in a range of 0.3 to 2 µm.

The metal mask part 14' is constituted by an electrodeposited metal, and has an opening part 14a corresponding to the printing pattern. The electrodeposited metal constituting this metal mask part 14' is the same metal as the electrodeposited metal 13b provided on the surface of the metal mesh 13a, and continues to this electrodeposited metal 13b. In other words, the electrodeposited metal constituting the metal mask part 14' was formed at the same time when the electrodeposited metal 13b was formed on the surface of the metal mesh 13a. The thickness t2b (corresponding to the thickness of the metal mask plate 14') of this electrodeposited metal is preferably in a range of 0.3 to 4 µm. It should be noted that the thickness t2b of the metal mask part 14' may be specified not only in a range of 0.3 to 4 µm, but also in a range of 0.3 to 2.5 µm, or in a range of 0.3 to 1.5 µm. It should be noted that FIG. 3 depicts an opening part 14a whose outer shape is rectangular, for the sake of illustration, in the electrodeposited metal constituting the metal mask part 14'; however, any of various shapes corresponding to the printing pattern can be adopted for the outer shape of the opening part 14a.

As is evident from FIGS. 7A to 8B, a fill space FS' is formed by the inner face of the opening part 14a in the metal mask part 14' and by the part of the metal mesh part 13 on the inner edge 14a1 side of the opening part 14a (top edge side in FIGS. 7A to 8B). Also, when the dimension from the outer edge 14a2 (bottom edge in FIGS. 7A to 8B) of the opening part 14a to the metal mesh part 13 represents a fill depth, this fill depth is the largest in the part corresponding to the center area of the opening part 14a (refer to fill depths D1a and D2a). To elaborate on the above, the fill depth gradually increases from the part corresponding to the peripheral area of the opening part 14a (refer to fill depths D1b and D2b) toward the part corresponding to the center area of the opening part 14a (refer to fill depths D1a and D2a). It should be noted that the ratio of the maximum value (refer to fill depths D1a and D2a) and the minimum value (refer to fill depths D1b and D2b), of fill depth, is preferably in a range of "1.2≤Maximum value/Minimum value≤2.0." In some embodiments, the size of the opening part is about 0.1 mm×about 0.4 mm to about 1.5 mm×about 7.0 mm (short side×long side), e.g., about 0.3 mm×about 1.2 mm.

Also, as is evident from FIGS. 7A to 8B, the aforementioned change in the fill depth is achieved by making the thickness (not accompanied by symbol) of the part of the metal mesh part 13 on the inner edge 14a1 side of the opening part 14a the smallest in the part corresponding to the center area of the opening part 14a (refer to fill depths D1a and D2a). To be specific, this is achieved by gradually decreasing the thickness (not accompanied by symbol) of the part of the metal mesh part 13 on the inner edge 14a1 side of the opening part 14a from the part corresponding to the peripheral area of the opening part 14a (refer to fill depths D1b and D2b) toward the part corresponding to the center area of the opening part 14a (refer to fill depths D1a and D2a). To be more specific, this is achieved by gradually decreasing the thickness (not accompanied by symbol) of the electrodeposited metal 13b in the part of the metal mesh part 13 on the inner edge 14a1 side of the opening part 14a from the part corresponding to the peripheral area of the opening part 14a (refer to fill depths D1b and D2b) toward the part corresponding to the center area of the opening part 14a (refer to fill depths D1a and D2a).

Figure 9A:
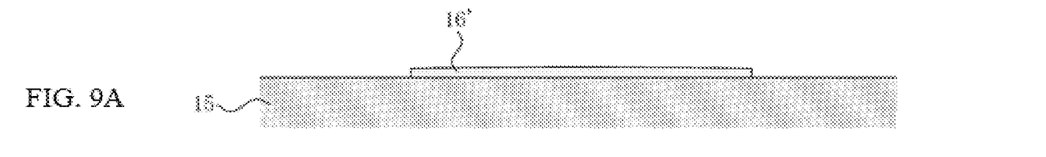
FIGS. 9A and 9B are drawings explaining an example of manufacturing method for a type whose metal mask part is constituted by an electrodeposited metal.
Figure 9B:
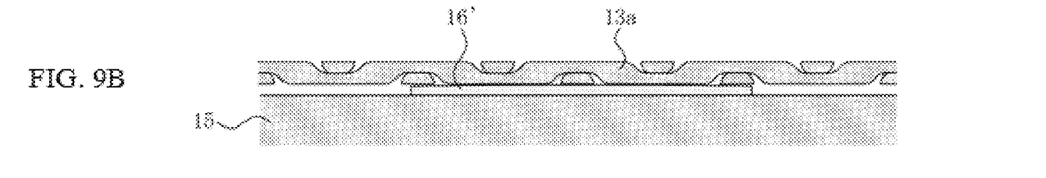

Here, FIGS. 9A and 9B are used to explain an example of a manufacturing method to obtain the mode shown in FIGS. 7A to 8B. It should be noted that the manufacturing method explained here is only an example and does not limit in any way the manufacturing method to obtain the mode shown in FIGS. 7A to 8B.

A substrate 15 formed by stainless steel or other metal is prepared, and a resist pattern 16' is formed on one side of the substrate 15 in a manner reversing the pattern of the opening part 14a in the metal mask part 14' (refer to FIG. 9A). This resist pattern 16' is formed by attaching a negative photoresist sheet to one side of the substrate 15, or by coating a positive or negative photoresist agent on one side of the substrate 15 and then eliminating the unnecessary parts using the photolithography method.

Then, the surface of the resist pattern 16' is processed into a curved convex shape. For this processing, brushing, blasting or other polishing method, or when a negative photoresist sheet or photoresist agent is used as part of the aforementioned photolithography method, a method of finishing the surface into a curved convex shape by utilizing the change in the swollen state of the resist pattern 16' due to development, may be adopted, among others.

Then, a metal mesh 13a is placed on top of the resist pattern 16' (refer to FIG. 9B), after which the electrocasting method is used to form an electrodeposited metal 13b on the surface of the metal mesh 13a. Because of this electrocasting, an electrodeposited metal 13b is formed on the surface of the metal mesh 13a, and at the same time the electrodeposited metal constituting the metal mask part 14' is formed continuously with the electrodeposited metal 13b (refer to FIGS. 7A to 8B).

Then, the metal mesh part 13 that now has the electrodeposited metal constituting the metal mask part 14', is detached from the substrate 15. If the resist pattern 16' has been detached together, the resist pattern 16' is removed after the detachment. The mode shown in FIGS. 7A to 8B is thus obtained.

The effects achieved by the screen printing plate 10 of the type whose metal mask part 14' is constituted by an electrodeposited metal are the same as the effects achieved by the screen printing plate 10 of the type whose metal mask part 14 is constituted by a metal plate, and are therefore not described.

Next, FIGS. 10A to 10E are used to explain an example of manufacturing method of electronic component using the aforementioned screen printing plate 10 (of the type whose metal mask part 14 is constituted by a metal plate, or the type whose metal mask plate 14' is constituted by an electrodeposited metal). It should be noted that the manufacturing method explained here is only an example and does not limit the manufacturing method of electronic component in any way.

Figure 10A:
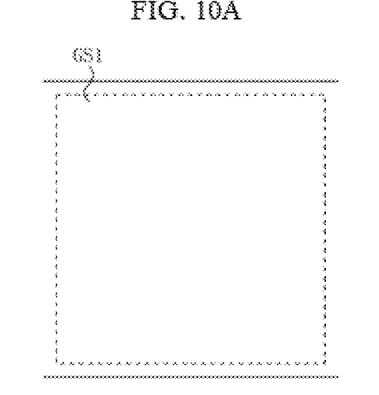
FIGS. 10A to 10E are drawings explaining an example of manufacturing method of electronic component using the screen printing plate explained in FIGS. 1 to 8B.
Figure 10B:
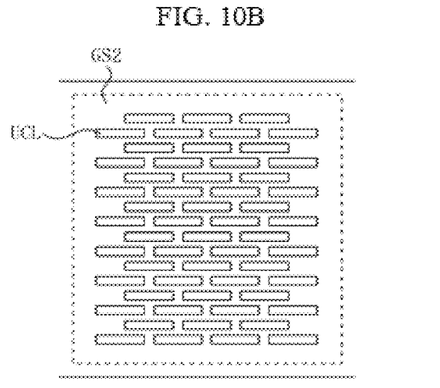

To manufacture an electronic component, such as multilayer ceramic capacitor, using the screen printing plate 10, the first step is to produce strip-shaped first green sheets GS1 as shown in FIG. 10A and produce strip-shaped second green sheets GS2 as shown in FIG. 10B.

The first green sheet GS1 may be produced by continuously coating the surface of a strip-shaped carrier film with a ceramic slurry containing powder of barium titanate or other dielectric ceramic, and then drying it. Also, the second green sheet GS2 may be produced by using the screen printing plate 10 to print onto the surface of the first green sheet GS1, and dry, a conductor paste containing powder of nickel or other metal, thereby forming a group of unsintered conductor layers UCL spaced at equal intervals.

The screen printing plate 10 used in the production of the second green sheet GS2 has multiple opening parts 14a corresponding to the printing patterns of the group of unsintered conductor layers UCL shown in FIG. 10B. Although FIG. 10B shows a group of unsintered conductor layers UCL formed in a zigzag pattern, the group of unsintered conductor layers UCL may be formed in a matrix pattern.

Figure 10C:
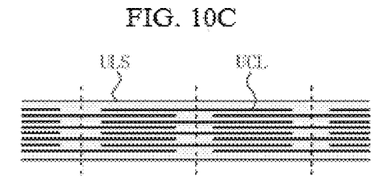

After the first green sheets GS1 and second green sheets GS2 have been produced, the sheet part shown by the broken line in FIG. 10A is detached from each first green sheet GS1, while the sheet part shown by the broken line in FIG. 10B is detached from each second green sheet GS2, and the resulting sheets are stacked by alternately changing the orientation by 180° as deemed appropriate and thermally compressed, to produce an unsintered multilayer sheet ULS shown in FIG. 10C.

Figure 10D:
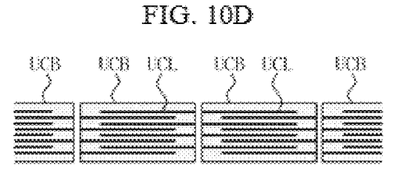

Then, the unsintered multilayer sheet ULS is cut to a grid along the cutting lines shown by the broken lines in FIG. 10C, to produce unsintered component bodies UCB shown in FIG. 10D. As shown in FIG. 10D, the unsintered conductor layers UCL in the unsintered multilayer sheet ULS are cut in half, and therefore the edges of the halved unsintered conductor layers UCL are exposed on the cut faces of each unsintered component body UCB.

Figure 10E:
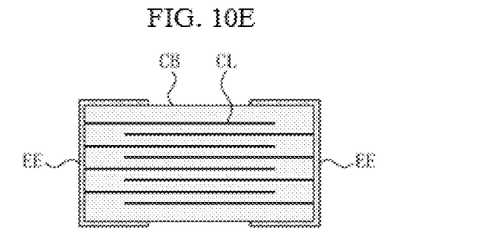

Then, many unsintered component bodies UCB are input to a sintering oven and sintered all at once in an ambience and at a temperature profile appropriate for the dielectric ceramic powder and metal powder, to produce component bodies CB with built-in conductor layers CL (refer to FIG. 10E). It should be noted that the sintered component bodies CB may be barrel-polished, as necessary.

Then, a conductor paste similar to the one mentioned above is applied to the opposing ends of the component body CB, and baked, to produce external electrodes EE as shown in FIG. 10E. Since the internal conductor layers CL are alternately exposed on the opposing end faces of the component body CB, the left external electrode EE in FIG. 10E is connected to the edges of the odd-numbered conductor layers CL as counted from the top, while the right external electrode EE is connected to the edges of the even-numbered conductor layers CL as counted from the top.

It should be noted that, in terms of the mode of the external electrodes EE, those illustrated in FIG. 10E are of a five-face type that continuously covers an end face of the component body CB and parts of four side faces adjoining the end face; for the mode of these external electrodes EE, however, a three-face type that continuously covers an end face of the component body CB and parts of two side faces (top and bottom faces in FIG. 10E) adjoining the end face, or a two-face type that continuously covers an end face of the component body CB and a part of one side face (bottom face in FIG. 10E) adjoining the end face, or other suitable types, may be adopted as deemed appropriate.

Additionally, if the external electrodes EE are to be produced by means of baking, first a conductor paste similar to the one mentioned above may be applied to the opposing ends of the unsintered component bodies UCB shown in FIG. 10D, and the unsintered component body UCB may be input to a sintering oven subsequently. This way, the step to produce external electrodes EE can be implemented by utilizing, and at the same time as, the sintering process of the step to produce component bodies CB.

The aforementioned screen printing plate 10 (of the type whose metal mask part 14 is constituted by a metal plate, or the type whose metal mask plate 14' is constituted by an electrodeposited metal) may be used in the manufacture of not only the aforementioned multilayer ceramic capacitors, but also other electronic components such as multilayer ceramic inductors and multilayer ceramic varistors. In other words, the screen printing plate 10 may be used in the manufacture of any electronic component so long as the conductor layers of the electronic component are produced by means of conductor-paste printing according to the screen printing method.

Also, according to the aforementioned screen printing plate 10, any variation that would make the actual printing thickness in the central part of the printed paste smaller than in other parts can be suppressed, even when the target printing thickness is reduced at the time of printing the conductor paste, and therefore the paste can be printed in a manner keeping the actual printing thickness as uniform as possible. In other words, use of the screen printing plate 10 in the manufacture of a multilayer ceramic capacitor or other electronic component allows for production of conductor layers of reduced thickness without causing their thickness to vary, which in turn allows for manufacture of a high-quality electronic component.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2017-060466, filed Mar. 27, 2017, and No. 2018-001627, filed Jan. 10, 2018, each disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A screen printing plate, comprising:
a metal mesh part and a metal mask part provided on one side of the metal mesh part integrally with the metal mesh part;
wherein the metal mask part has at least one opening part, and
when a distance between a plane defined by an outer edge of the opening part and an exposed face of the metal mesh part represents a fill depth, the fill depth at a center area of the opening part is larger than the fill depth at an entire periphery of the opening part at the outer edge, and the fill depth is largest at the center area of the opening part.

2. The screen printing plate according to claim 1, wherein the fill depth increases from a part corresponding to a peripheral area of the opening part toward the part corresponding to the center area of the opening part.

3. The screen printing plate according to claim 1, wherein a thickness of the metal mesh part is smallest in the part corresponding to the center area of the opening part.

4. The screen printing plate according to claim 1, wherein a thickness of the metal mesh part decreases from the part corresponding to a peripheral area of the opening part toward the part corresponding to the center area of the opening part.

5. The screen printing plate according to claim 1, wherein the metal mesh part is constituted by a metal mesh and an electrodeposited metal provided on a surface of the metal mesh.

6. The screen printing plate according to claim 5, wherein the metal mesh of the metal mesh part is calendered.

7. The screen printing plate according to claim 5, wherein the metal mask part is constituted by a metal plate, and the metal plate constituting the metal mask part is joined to the metal mesh part by the electrodeposited metal provided on the surface of the metal mesh.

8. The screen printing plate according to claim 5, wherein the metal mask part is constituted by an electrodeposited metal, and the electrodeposited metal constituting the metal mask part is joined to the electrodeposited metal provided on the surface of the metal mesh of the metal mesh part.

9. The screen printing plate according to claim 1, wherein a thickness of the metal mask part is within a range of 0.3 to 4 µm.

10. The screen printing plate according to claim 1, wherein a thickness of the metal mask part is within a range of 0.3 to 2.5 µm.

11. The screen printing plate according to claim 1, wherein a thickness of the metal mask part is within a range of 0.3 to 1.5 µm.

12. A manufacturing method of electronic component using the screen printing plate according to claim 1, the manufacturing method of electronic component comprising:
a step to produce first ceramic green sheets;
a step to produce second ceramic green sheets having unsintered conductor layers, by printing a conductor paste on surfaces of the first ceramic green sheets by using the screen printing plate, wherein each unsintered conductor layer is formed on each surface in a manner having a thickness corresponding to the fill depth adjusted in the opening part;
a step to produce an unsintered multilayer sheet by stacking alternately the first ceramic green sheets and the second ceramic green sheets;
a step to cut the unsintered multilayer sheet to produce unsintered component bodies;
a step to produce component bodies with built-in conductor layers by sintering the unsintered component bodies; and
a step to form external electrodes connected to the conductor layers, on the surfaces of the component bodies.

13. The manufacturing method of electronic component according to claim 12, wherein the step to form external electrodes is implemented by utilizing, and at a same time as, a sintering process of the step to produce component bodies.

14. The manufacturing method of electronic component according to claim 12, wherein the electronic component is a multilayer ceramic capacitor.

15. A screen printing plate comprising:
a metal mesh part and a metal mask part provided on one side of the metal mesh part integrally with the metal mesh part;
wherein the metal mask part has at least one opening part, and
when a distance between a plane defined by an outer edge of the opening part and an exposed face of the metal mesh part represents a fill depth, the fill depth is largest at a center area of the opening part,
wherein a thickness of the metal mesh part decreases from the part corresponding to a peripheral area of the opening part toward the part corresponding to the center area of the opening part.

* * * * *